Nov. 21, 1967  J. V. BERGEIJK ET AL  3,353,564
LAMINAR FLOW DEVICE

Filed Oct. 20, 1964  2 Sheets-Sheet 1

INVENTORS
J. VAN BERGEIJK
H. NIEUWENHUIJSEN
BY
ATTORNEY

A-A

INVENTORS
J. VAN BERGEIJK
H. NIEUWENHUIJSEN
BY
ATTORNEY

United States Patent Office 3,353,564
Patented Nov. 21, 1967

3,353,564
LAMINAR FLOW DEVICE
Jan V. Bergeijk, Rozendaal, Gelderland, and Hans Nieuwenhuijsen, Velp, Netherlands, assignors to American Enka Corporation, Enka, N.C., a corporation of Delaware
Filed Oct. 20, 1964, Ser. No. 405,210
Claims priority, application Netherlands, Nov. 1, 1963, 300,045
6 Claims. (Cl. 138—41)

ABSTRACT OF THE DISCLOSURE

Apparatus for achieving a uniform velocity distribution of viscous liquids in tubes, columns or polymerization reactors circular in cross-section comprising wall to wall plates spaced at intervals $\frac{1}{3}$ less than the diameter of the tubes, columns or circular reactors in which they are positioned and having openings in the plates less than $\frac{1}{20}$ of the same diameter.

---

This invention relates to a flow conduit for the transportation of fluids under laminar flow conditions. More particularly it relates to continuous polymerization vessels in which uniform dwell times are maintained for the materials being polymerized during transportation therethrough.

In the field of transportation of highly viscous materials under laminar flow conditions, the fluid moving through a transporting conduit develops a velocity profile due to the friction set up at the boundary or wall surface of the conduit. Under laminar flow conditions the initial velocity of all the fluid particles introduced into a flow stream is uniform. As the friction created by the transporting conduit wall surface takes effect, the outer particles or layers of moving material are slowed down. The central layers of the stream continue at higher velocity due to less friction drag and a velocity profile is thus created within a plane extending longitudinally through the center of the flowing stream. This velocity profile achieves the shape of a true parabola in a theoretical infinite distance of travel. However, this parabolic profile, for all practical purposes, is reached at a distance $.13\ Re \times d$, where $Re$ = Reynolds number of the moving material, and
$d$ = internal diameter of conduit.

Thus, when highly viscous materials are being transported through a column, the parabola profile is developed quite rapidly. The change in the velocity profile is caused by the friction of the walls of the vessel, which slows down the outer boundary of the flowing material, allowing the central portion of the material to progress more rapidly in the flow direction than the boundary material. This difference in velocity across the cross-sectional face of a laminar flow stream allows certain portions of material introduced into the stream to arrive at a given point in the stream in a shorter time than other portions. This phenomenon is undesirable in many situations. In the continuous flow equipment used in polymerization this characteristic produces a non-uniform product because of the chemical changes occurring in the materials contained therein. During polymerization utilizing a continuous flow reactor, the fraction of material at the wall of the reactor will have a longer residence time due to friction and becomes even slower due to its higher viscosity developed during prolonged polymerization. Thus, non-homogenous viscosity can produce irregular polymer products and create thermo-degradation in the material having longer residence time in the reactor.

In such continuous flow reactors, an ideal transportation of the material through the reaction zone necessitates maintaining a flat velocity profile in the material being transported. The industry has long sought a means to achieve this flat profile by the use of various baffle systems or mixing devices. The object of the experimentation in the field has been to provide a design which would tend to flatten this inherent parabolic profile and maintain what is commonly known as "plug flow" in the moving material. In this manner the residence time of material moving through a reacting zone can be made more uniform, thus producing a more uniform and highly desirable product.

One particular design which has been developed in the field of synthetic thermoplastic material polymerization has been the use of centrally supported baffle screens having annular slits adjacent the flow conduit wall. The purpose of the slits was to provide an area of decreased resistance at a point in which the fluid was most strongly affected by wall friction. However, this configuration has not been satisfactory because of the tendency of the velocity curve to invert after passage through the baffle screen due to the central resistance developed by the screen. Thus, the apparatus produces non-uniformity of velocity in one direction for a period of time due to conduit wall friction and then non-uniformity in the other direction as the liquid moves through the screens. This continuous change in velocity profile produces "dead spots" along the inner surface of the wall between the baffle screens. These dead spots allow the material to collect, become highly viscous, and produce an irregular degree of polymerization with respect to the major portion of the flow material. The central support means for these screens also provides a friction surface whereby a lag is created in the material adjacent the support means, thus producing additional non-uniformity in the product. An object of this invention is to overcome the above-mentioned disadvantages.

A primary object of this invention is to provide a means for maintaining a flattened velocity profile during laminar flow of viscous materials.

Another object of this invention is to provide a baffle system for use in polymerization columns to product plug flow therein.

It is an additional object of this invention to provide a continuous flow polymerization column for maintaining uniform residence time of the material being treated.

These and other objects of the invention will become apparent from the following detailed description and accompanying drawings.

It has been found that a velocity profile approaching that of a straight line, i.e., "plug flow," can be produced in a continuous flow polymerization column by providing a plurality of wall to wall sieve plates having holes of a particular size and spaced at specific intervals throughout the flow path.

A chemical process carried out in a continuous flow reactor will generally give less favorable results than a batch process carried out under optimum conditions. This is due to the fact that various fractions of fluid moving under laminar conditions through the continuous flow reactor do not remain in the reactor for the same length of time. This range in "residence time" is caused by differences in velocity occurring across the face of flow stream. The fractions at the wall of the continuous flow reactor, due to friction, are provided with a longer residence time in the reactor. In polymerization columns, these fractions tend to polymerize more highly and increase in viscosity. As a result, a non-uniform polymerization takes place, which in turn produces inferior products or renders the polymerized material unsuitable for further processing.

To obtain laminar, viscous flow in a tube or reactor in which all fractions will have a uniform residence time, it has been found necessary to provide stationary elements or baffles which flatten and maintain flattened the parabolic velocity profile. It is necessary that these elements offer the same resistance to all fractions of the flow during its passage through the tube. It has been found that this can be achieved only by introducing a homogenous flow resistance over the whole circular cross section of the tube. It is necessary that this resistance be higher than the wall resistance of an empty tube or reactor in order to prevent the development of the characteristic parabolic velocity profile. In seeking to establish an optimum velocity profile, or "plug flow," the following requirements must be met.

(1) the profile flattening means must not induce stagnant areas in the flow where the polymer, with long residence and settlement time, can thicken and undergo degradation.

(2) There should be as little wall surface as possible presented in the flattening means.

(3) The specific volume of the flattening means should be as small as possible so that it occupies little effective reactor volume.

The best approximation of "plug flow" can be obtained by the use of flat screens or perforated plates covering the whole central cross section of the column and placed at certain intervals along the tube axis. The effectiveness of the plates or screens in producing "plug flow" is dependent upon the hole or perforation size and the distance between the screens in relation to the column diameter. The invention can be better explained by reference to the following drawings in which.

Figure 1:
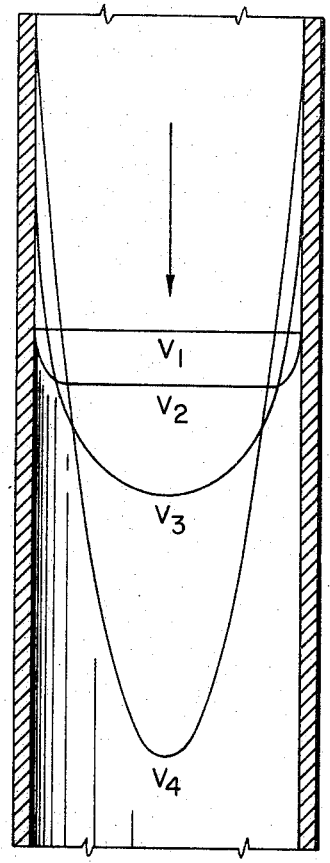
FIGURE 1 shows the velocity profile produced during laminar flow through an unrestricted conduit or tube, illustrating the change in appearance of the profile at various distances along the flow path.

With reference to FIGURE 1, the velocity profile of a typical laminar flow stream is illustrated at various positions in the flow path by curves $V_1$ through $V_4$. $V_1$ shows the face of the velocity profile at initial introduction of material into a flow tube. As the initial portion of material introduced at velocity $V_1$ proceeds in the direction indicated by the arrow, the velocity profile of the fluid begins to bend as the wall friction slows down the outer layers of the material. $V_2$ and $V_3$ show the progressive effect of wall friction on the stream during its travel through the conduit. $V_4$ shows the complete parabolic profile achieved at infinite distance along the tube. It is obvious that, with highly viscous materials, this parabolic profile is essentially produced in a very short distance of fluid travel. In attempting to design apparatus to produce "plug flow" in order to maintain a uniform dwell time of the material in a given flow stream, it is the purpose of the design of the present apparatus to flatten the parabolic curve $V_4$ to approximate the straight line profile $V_1$. In this way material undergoing chemical change during passage through a reactor column will receive uniform treatment due to the fact that all material entering the column at a given time reaches the end of the column at the same time. This uniform residence is most nearly achieved by maintaining a flat velocity profile.

Figure 2:
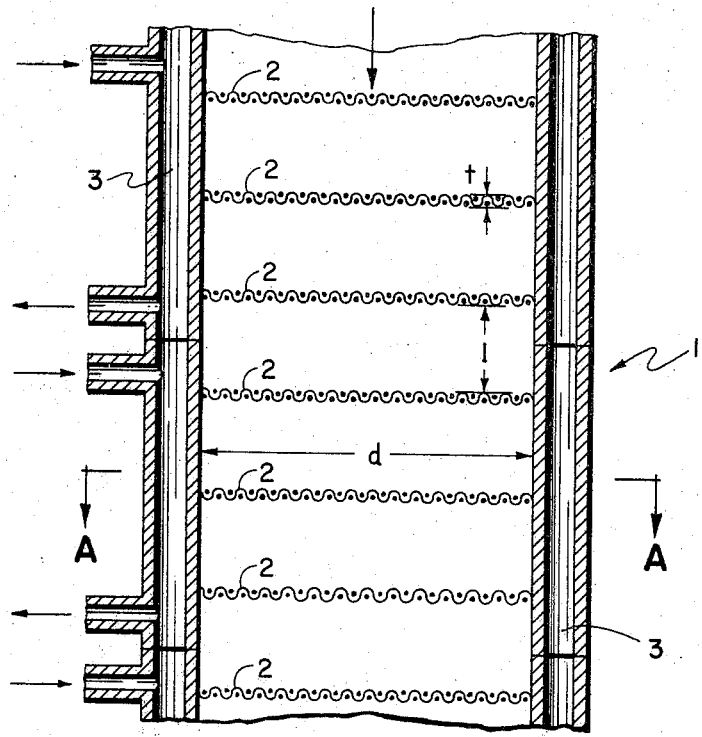
FIGURE 2 shows a polymerization column in which a series of baffle plates or screens have been positioned to provide uniform residence time in materials being treated therein.

FIGURE 2 shows a typical continuous flow polymerization column 1. The profile dampening baffle plates or screens 2 are shown located perpendicular to the path of material flow and spaced at distance $l$ from each other along the flow path. The arrow indicates the direction of flow of material being polymerized. The column may be heated or cooled by appropriate jacketed heating means 3. A plurality of jackets may be used as shown and can be connected to a system of circulating heating or cooling fluid. In this way the various column zones surrounded by the jackets may be maintained at any desired temperature. The diameter of the tube or reactor is shown by distance $d$ and the thickness of the baffle screen by thickness $t$.

Figure 3:
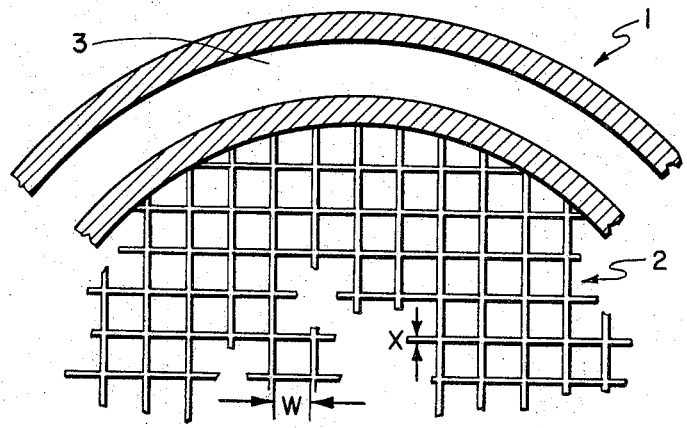
FIGURE 3 is a sectional view taken along line A—A of FIGURE 2 and shows the dimensions of the perforations when using as a baffle means a woven mesh screen.

FIGURE 3, a cross-sectional view taken along line A—A of FIGURE 2, shows the dimensions of the perforations in the baffle screen and the effective thickness between openings. The baffle means is shown in FIGURE 3 to be a woven mesh screen. However, other baffles such as circular plates having openings therein may be used. The characteristic width of the perforations or openings is shown by distance $w$ while distance $x$ indicates the thickness of the partition between openings. The openings may be circular or rectangular and the characteristic width $w$ is understood to be the diameter of the circular openings and the long side of the rectangular openings. When the mesh of the screens is small enough, the flow resistance of the tube wall in the neighborhood of the screens is negligible as compared with the flow resistance of the screen, and the velocity distribution over the screened cross section of the column will be uniform. Between the screens the wall resistance will induce the start of a parabolic velocity profile again. However, when the screens are placed sufficiently close to each other, this parabolic profile has no opportunity to develop and the uniform velocity distribution or "plug flow" is preserved.

It has been found that a uniform velocity distribution may be achieved by maintaining distance $l$ between the wall to wall plates less than ⅓ of the tube diameter and the characteristic width of the openings $w$ less than ½₀ of the tube diameter. The viscous flow resistance of the wire screen is only slightly affected by the diameter of the wire strands, but since the amount of stagnant polymer around the wires increases with the diameter, the wire strands should preferably be as thin as construction permits. Therefore, the thickness of the partitions $x$ between the openings should be kept as thin as possible in order to prevent stagnant areas in the fluid flow. Preferably the thickness of the plates $t$ should be less than twice the thickness of the partitions $x$.

The following specific example illustrates the results obtained in utilizing a column designed according to the present invention. A polymerization reactor column having an internal diameter of 50 cm. was provided with a number of wire baffle gauzes attached at their circumference to the inner wall of the tube. The gauzes were of symmetrical, square-shaped weave and were placed at 12 cm. intervals in the tube. The mesh width was 1 cm. and the thickness of the wire was 1.5 mm. Passage of a highly viscous material through the tube produced a penetration time of the fastest liquid portions only 10% greater than the mean residence time of the liquid in the column. Thus, by maintaining the mesh size and baffle spacing within the limits of the invention, a highly uniform residence time can be achieved.

Many modifications may be made in the particular baffle material chosen to flatten the viscosity profile curve so long as the spacings and hole size of the baffle elements are maintained within the limits heretofore explained. Such a system is not restricted to use in polymerization columns but may be appropriately used in any system involving laminar flow and the present invention is limited only to the extent of the following claims.

What is claimed is:

1. A flow tube for achieving uniform velocity distribution in viscous liquids, said flow tube having supported therein transversely to the axis of flow a plurality of perforated baffle means, each of said baffle means extending completely across said flow tube and successive baffle means being spaced at intervals less than 1/3 the inside diameter of said tube, the characteristic width of each perforation in said baffle means being less than 1/20 of said tube diameter, and the baffle means having a thickness less than twice the distance between adjacent perforations whereby to obtain laminar viscous liquid flow in which all liquid fractions will have a uniform residence time in said tube.

2. The apparatus as defined in claim 1 in which the baffle means is a wire screen.

3. The apparatus as defined in claim 1 in which the baffle means is a flat plate.

4. The apparatus as defined in claim 1 in which the perforations are rectangular.

5. The apparatus as defined in claim 1 in which the perforations are circular.

6. The apparatus as defined in claim 1 in which the perforations are square.

References Cited

UNITED STATES PATENTS

| | | | |
|---|---|---|---|
| 1,404,652 | 1/1922 | Rohnow | 138—41 X |
| 3,128,794 | 4/1964 | Boucher et al. | 138—37 |
| 3,217,750 | 11/1965 | Thomas | 138—41 |

LAVERNE D. GEIGER, *Primary Examiner.*

T. L. MOORHEAD, *Assistant Examiner.*